INVENTOR
KENNETH E. SCHREINER
BY
SUGHRUE, ROTHWELL, MION & ZINN
ATTORNEYS

Oct. 22, 1963 K. E. SCHREINER 3,108,193

STORAGE REGISTER

Filed Dec. 28, 1959 5 Sheets-Sheet 2

Oct. 22, 1963 K. E. SCHREINER 3,108,193

STORAGE REGISTER

Filed Dec. 28, 1959 5 Sheets-Sheet 3

Oct. 22, 1963 K. E. SCHREINER 3,108,193

STORAGE REGISTER

Filed Dec. 28, 1959 5 Sheets-Sheet 4

United States Patent Office 3,108,193
Patented Oct. 22, 1963

3,108,193
STORAGE REGISTER

Kenneth E. Schreiner, Harrington Park, N.J., assignor to International Business Machines Corporation, New York, N.Y., a corporation of New York Filed Dec. 28, 1959, Ser. No. 862,353
1 Claim. (Cl. 307—88)

This invention relates to storage registers and more particularly to storage registers utilizing bistable sub-harmonic generators.

Recently, bistable circuits have been developed utilizing an electromagnetic device possessing both capacitance and inductance, at least one of which is non-linear, and having a resonant frequency for oscillations about its state of equilibrium. These devices are excited by an amplitude modulated power wave and their output is controlled by an additional input signal of a particular phase. The output of the device contains sub-harmonics which are dependent upon the phase of the input signal. Such devices are shown and described in United States Patent 2,815,488, of John von Neumann, entitled "Non-Linear Capacitance or Inductance Switching, Amplifying, and Memory Organs," and of common assignee herewith.

The use of such devices in logical circuits is quite desirable. In addition to the usual advantages of solid state devices over vacuum tubes, these devices exhibit particularly high speed-operating up to 1,000 times faster than conventional vacuum tube circuits. Reference is made to the U.S. Patent 3,000,564, of common inventor herewith, issued September 19, 1961, entitled "Electronic Apparatus." In that patent there is shown a sub-harmonic generator particularly suitable for use in logical circuits and there is shown certain logical circuits making use of this bistable sub-harmonic generator. That patent shows, for example, the use of bistable sub-harmonic generators in AND, OR, and majority circuits. An application for a U.S. patent entitled "Non-Linear Resonant Apparatus and Method," Serial No. 745,573, filed June 30, 1958, and to the same inventor shows sub-harmonic generator suitable for use at extremely high frequencies. In certain applications it is desirable to use these same solid state sub-harmonic generators in storage and shift registers. In accordance with this invention such storage and shift registers are provided.

Accordingly, it is an object of the present invention to provide a novel shift register circuit utilizing bistable sub-harmonic generators.

It is another object of the present invention to provide shift registers utilizing bistable sub-harmonic generators in such a manner that input information can be loaded into the first stage of the register and shifted to subsequent stages, or, information already loaded in the register can be continuously re-circulated in the register.

It is a further object of the present invention to provide a shift register using bistable sub-harmonic generators in such a manner that information can be shifted from stage to stage or merely stored in the register as desired.

It is a further object of the present invention to provide a shift register utilizing bistable sub-harmonic generators in such a manner that information can be shifted to either the right or to the left in the register.

These and other objects of the invention will become more apparent from the detailed description and appended claims that follow.

In accordance with one embodiment of my invention I provide a plurality of series connected bistable sub-harmonic generators. The power supply voltages applied to each sub-harmonic generator are amplitude modulated in such a way that each sub-harmonic generator passes through a critical region of its response characteristic during which an input of a particular phase will be reflected in the output as a sub-harmonic of a particular phase. The patterns of voltages applied to each of the sub-harmonic generators are timed so that the power supply amplitude of each sub-harmonic generator exceeds the critical level of its response characteristic during the time interval that the previous sub-harmonic generator remains in its energized state. By this means the output signal of each sub-harmonic generator is effective as an input signal to control the output of the next succeeding sub-harmonic generator. By proper selection of the patterns of power supply voltages to be applied to each of the sub-harmonic generators, information in the form of a bistable phase condition is shifted from each sub-harmonic generator to succeeding sub-harmonic generators in a shift register type of operation.

Provision is also made for changing the operation of the register from a read-in condition to a re-circulating condition. When the register is in the read-in condition, new information is continuously inserted into the first stage of the register and shifted to succeeding stages. When the register is in the re-circulating condition, information previously loaded in the register is re-circulated. This switching from one type of operation to another type of operation is accomplished by providing a periodic read-in control voltage which has a bistable phase condition with respect to the power supply voltages applied to the sub-harmonic generator. When the read-in control voltage is in one of these two phase conditions, new information is loaded into the register and shifted in a shift register type of operation. When the read-in control voltage is of the other phase condition, the information previously loaded into the register is re-circulated in the register.

In other embodiments of the subject invention, a shift register is provided which will shift information from stage-to-stage of the shift register or will store information in each stage in response to switching of the shift control voltage from one phase to another. In still another embodiment of the subject invention provision is made for shifting information to either the left or to the right in the shift register.

A better understanding of my invention can be had from the following description taken in conjunction with the accompanying drawings in which.

Figures 4, 4A:
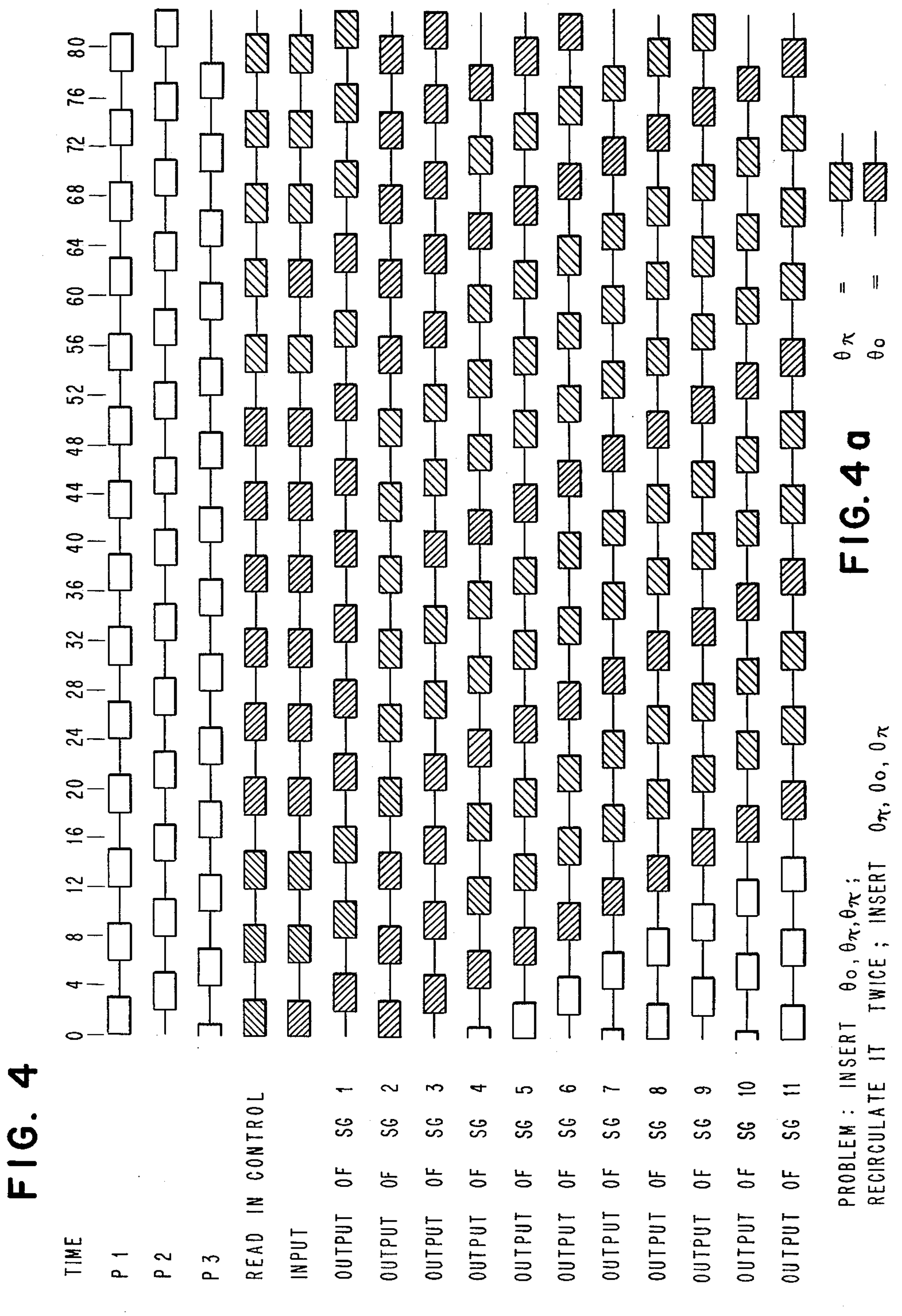
FIGURE 4 is a timing diagram depicting the operation of the circuit of FIGURE 3.
Figure 5:
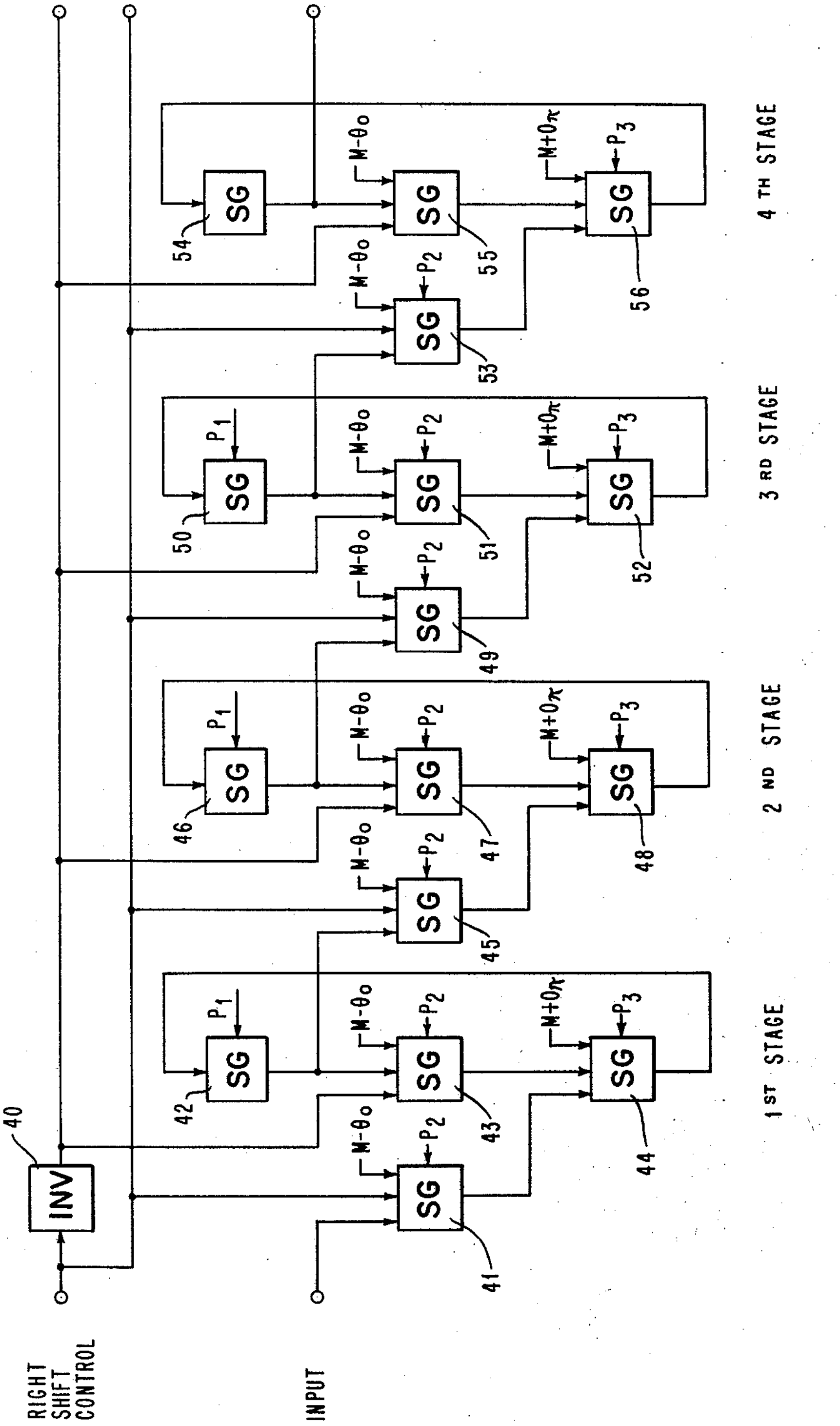
Figures 6, 6A:
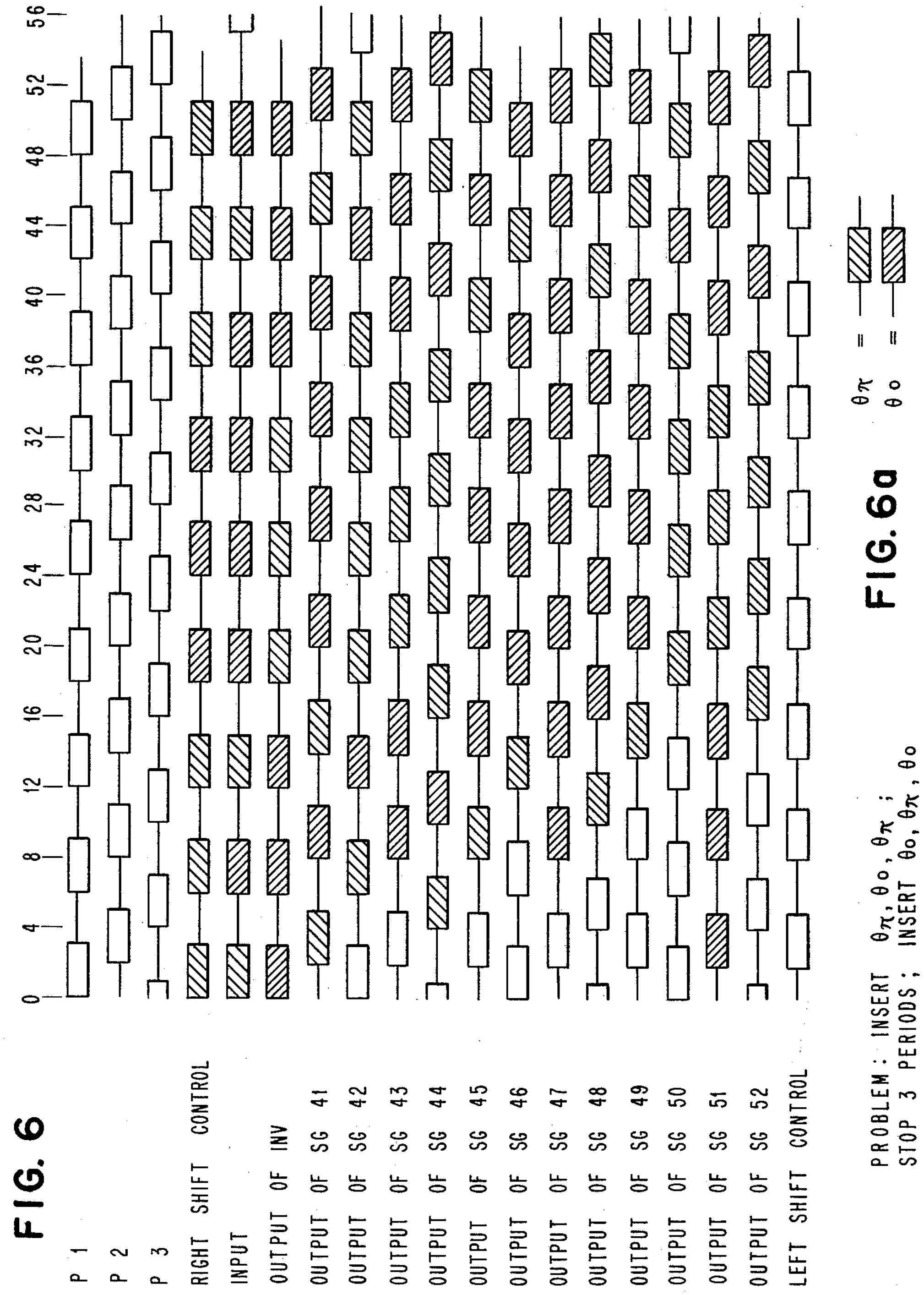
Figure 7:
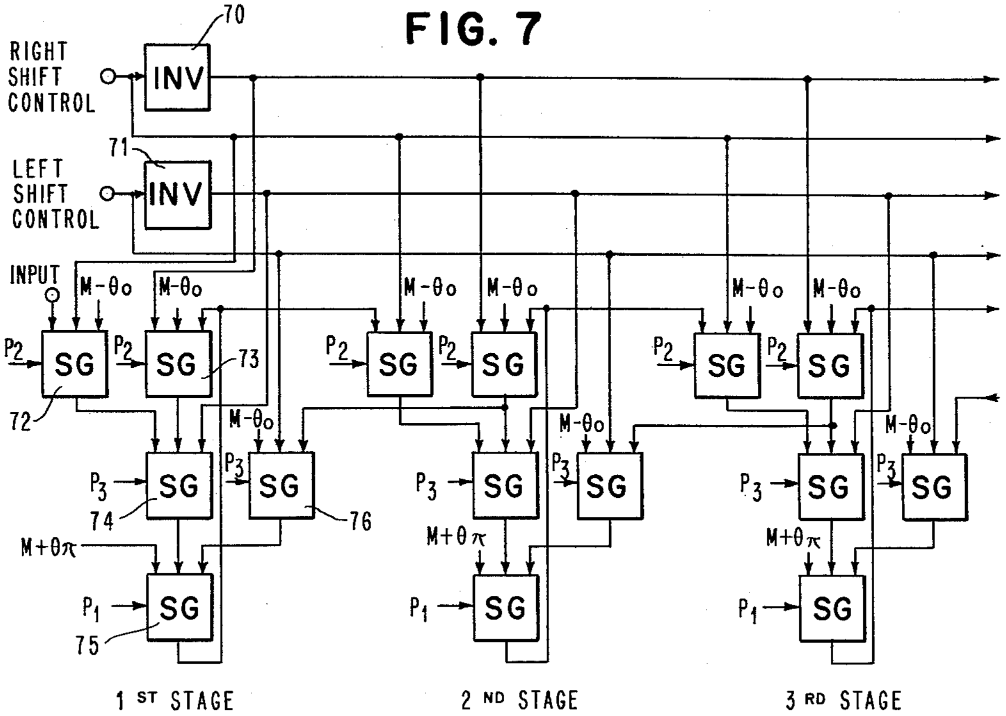
Figure 8:
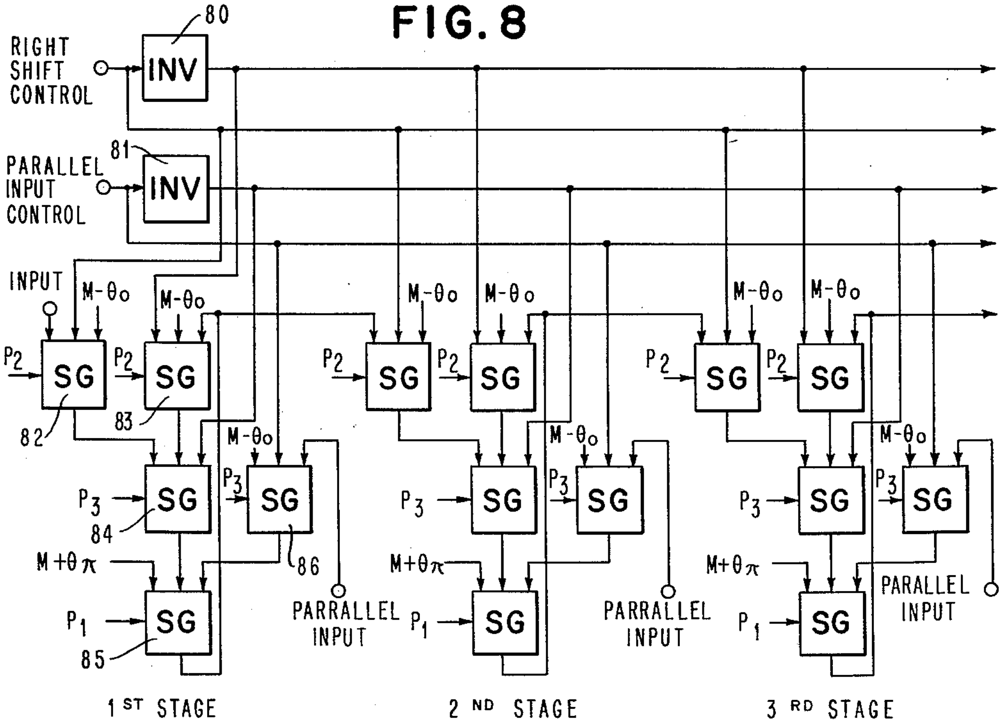

FIGURE 4*a* is a legend for FIGURE 4;

FIGURE 5 shows another embodiment of the shift register of the subject disclosure;

FIGURE 6 is a timing diagram depicting the operation of the shift register of FIGURE 5;

FIGURE 6*a* is a legend for FIGURE 6;

FIGURE 7 shows a shift register of still another embodiment of the subject invention;

FIGURE 8 is a modification of the shift register shown in FIGURE 7.

Figure 1:
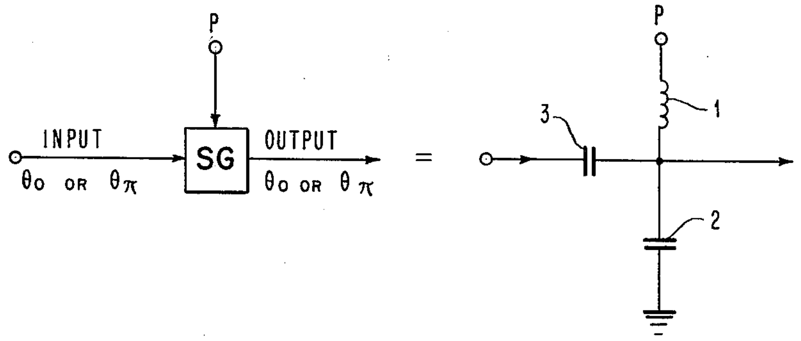
FIGURE 1 shows a sub-harmonic generator having a single input.

Referring to FIGURE 1, there is shown a sub-harmonic generator in block form and in schematic form. Referring to the block form of the sub-harmonic generator, a power wave P from a suitable power supply is applied to the sub-harmonic generator. An input having a predetermined phase relationship with the power wave is also applied to the sub-harmonic generator. This input may be of a phase relationship designated $\theta_0$ or a phase relationship 180° out of phase with $\theta_0$, designated $\theta_\pi$.

Referring to the schematic representation of the sub-harmonic generator of FIGURE 1, it comprises a series resonant circuit made up of an inductance 1 and a non-linear capacitor 2. The input is applied to the series tuned circuit through a capacitor 3 which has a capacitance much less than the capacitance of the capacitor 2.

As described in the above-mentioned Von Neumann patent and the above-mentioned applications to the same inventor, the sub-harmonic generator may take other forms than that shown in FIGURE 1. For example, a non-linear inductance may be used instead of a non-linear capacitor of FIGURE 1. In addition, a parallel tuned resonant circuit may be employed instead of the series circuit of FIGURE 1. The above-identified applications to the same inventor fully describe the operation of a sub-harmonic generator such as that shown in FIGURE 1. Briefly, the operation is as follows. Assume that a suitable power wave, for example, a 1-megacycle sine wave, is applied to the P terminal of the sub-harmonic generator. Assume further that a suitable input having a frequency of half the frequency of the power wave, in this example, .5 megacycle, is impressed on the input. This input may have a phase displacement of a predetermined amount with respect to the power wave. An input with such a phase displacement is referred to as $\theta_0$ input. The input may also be displaced in phase by 180° with respect to the $\theta_0$ input. Such an input is referred to as a $\theta_\pi$ input. The sub-harmonic generator of FIGURE 1 has the property that when a $\theta_0$ input is applied the output will have a sub-harmonic having a $\theta_0$ phase relationship with respect to the power wave. This is referred to as a $\theta_0$ output. Further, such an output will continue after the input ceases to be applied. The $\theta_0$ output will continue until the amplitude of the power wave drops below the critical level. The operation is similar when a $\theta_\pi$ input is applied. Thus, such a sub-harmonic generator has bistable characteristics; that is, its output is either $\theta_0$ or $\theta_\pi$. Further, the sub-harmonic generator has memory characteristics; that is, it is capable of retaining the characteristics of an input after the input ceases to be applied.

Figure 2:
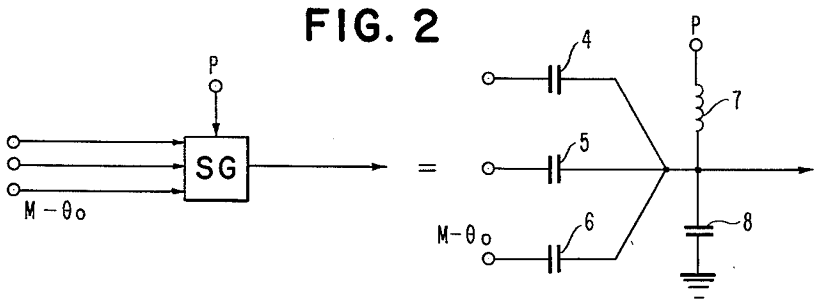
FIGURE 2 shows a sub-harmonic generator having three inputs.

The sub-harmonic generator of FIGURE 2 is quite similar to that of FIGURE 1 except that three inputs, all having the same amplitude, are applied to the sub-harmonic generator of FIGURE 2. These inputs are applied through capacitors 4, 5, and 6 to the series resonant circuit made up of the inductance 7 and the non-linear capacitor 8. Further, one input is shown biased to one phase condition designated M— which is a $\theta_0$ phase condition. Such a sub-harmonic generator has the properties of an AND circuit. The phase condition of the output will correspond to the phase condition applied to the majority of the inputs. Therefore, the circuit has the property of producing a $\theta_\pi$ output only when both of the top two inputs are in the $\theta_\pi$ phase condition. When either or both of the top two inputs are in the $\theta_0$ condition, the output will be $\theta_0$.

Figure 3:
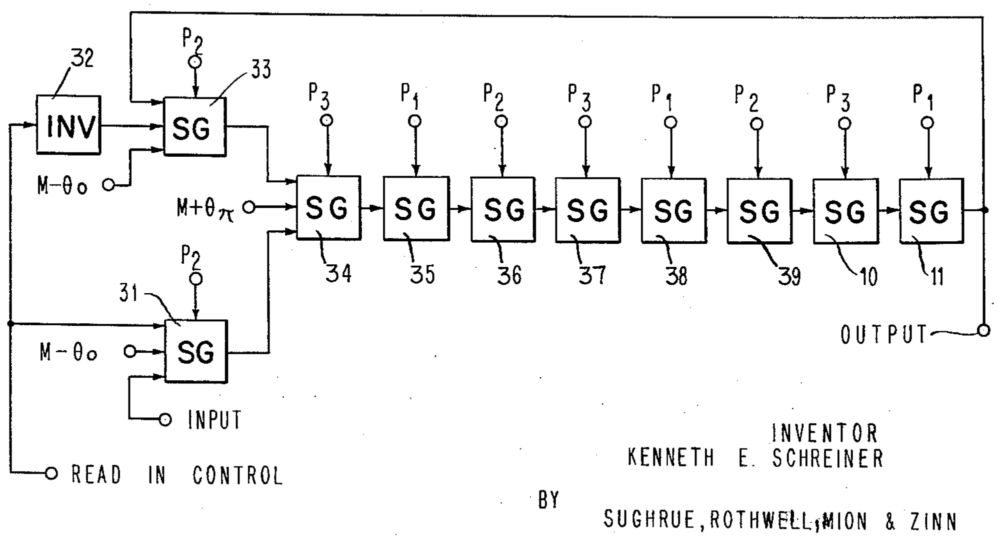
FIGURE 3 shows a shift register of the subject invention.

Referring to FIGURE 3, there is shown a storage register of the type into which input information is inserted and then shifted to succeeding stages of the shift register. The input information is applied to a sub-harmonic generator 31 which is biased to the $\theta_0$ condition. In order to control the insertion of input information into the storage register, a read-in control voltage is provided which is connected to the sub-harmonic generator 31. The read-in control voltage is also applied to an inverter 32 which inverts the phase of the read-in control voltage by 180°. That is, if a $\theta_0$ phase condition is applied to the inverter 32, the output of the inverter 2 will be a $\theta_\pi$ phase condition.

The output of the inverter 32 is applied to a sub-harmonic generator 33 which is designated the re-circulation sub-harmonic generator. Sub-harmonic generator 33 is biased to the $\theta_0$ phase condition. The output of the input sub-harmonic generator 31 and the output of the recirculation sub-harmonic generator 33 are applied to a sub-harmonic generator 34 which is biased to the $\theta_\pi$ phase condition. The output of sub-harmonic generator 34 is applied to the input of sub-harmonic generator 35, the output of which is applied to the series connected sub-harmonic generators 36, 37, 38, 39, 10, and 11.

In order to re-circulate information stored in the register, the output of the sub-harmonic generator 11 is connected back to the input of sub-harmonic generator 33. The power supply voltages designated $P_1$, $P_2$, and $P_3$ are each of a predetermined amplitude modulation such that input information will be shifted in the register. The pattern of amplitude modulation of each of the power supplies can best be seen by reference to FIGURE 4. Referring to this timing diagram, it can be seen that the power supply $P_1$ impresses a 1-megacycle wave on the sub-harmonic generators 35, 38 and 11 during the time periods 0 to 3, 6 through 9, 12 through 15, 18 through 21, and so on. Similarly, the power supply $P_2$ impresses a 1-megacycle wave on the sub-harmonic generators 31, 33, 36 and 39 during the time periods 2 through 5, 8 through 11, 14 through 17, 20 through 23, and so on. Similarly, the power supply $P_3$ impresses a 1-megacycle wave on the sub-harmonic generators 34, 37 and 10 during the time periods 4 through 7, 10 through 13, 16 through 19, 22 through 25, and so on. While the power supply voltages have been represented schematically as abruptly changing from zero amplitude to a significant amplitude, it should be understood that actually the change is more gradual. This is also true for the remainder of the waveforms shown schematically in the timing diagrams.

Still referring to FIGURE 4, it can be seen that the read-in control voltage occurs periodically and can be of either a $\theta_0$ or a $\theta_\pi$ condition. This read-in control voltage is applied to sub-harmonic generator 31 and to sub-harmonic generator 33, through inverter 32, in such a manner that when the read-in control voltage is in the $\theta_\pi$ condition, the output of sub-harmonic generator 31 will be dependent upon the phase condition of the input. Under such circumstances, input information is inserted into the register.

However, when the read-in control voltage is in the $\theta_0$ condition, the output of sub-harmonic generator 31 will always be $\theta_0$ because sub-harmonic generator 31 is biased to the $\theta_0$ condition. Under these circumstances, the output of inverter 32 is $\theta_\pi$ which is applied to sub-harmonic generator 33. The output of sub-harmonic generator 33 will then be dependent upon the output of sub-harmonic generator 11 which is applied to the top input of sub-harmonic generator 33. Under these circumstances information stored in the register is re-circulated, that is, when it is shifted out of sub-harmonic generator 11 it is re-inserted into sub-harmonic generator 33.

The operation of the storage register of FIGURE 3 can best be understood with reference to a problem situation. This problem, as indicated at the bottom of FIGURE 4, and legend therefor in FIGURE 4*a*, is to insert three bits of information, $\theta_\pi$, $\theta_0$, $\theta_\pi$, into the storage register. Each of these bits of information is shifted from stage to stage of the storage register. After inserting the bits of information, the information is re-circulated twice in the storage register. Three new bits of information are then inserted into the register $\theta_\pi$, $\theta_0$, and $\theta_\pi$.

In order to accomplish this, the read-in control voltage is in the $\theta_\pi$ phase condition during time periods 0 through 3, 6 through 9, and 12 through 15. This permits input information to be inserted into sub-harmonic generator 31 during these timed periods. Therefore we see that the $\theta_0$ input applied during time periods 0 through 3 is accepted by sub-harmonic generator 31 and the output of sub-harmonic generator 31 during time periods 2 through 5 is $\theta_0$. Similarly, the input during time period 6 through 9 is $\theta_\pi$, the second bit to be entered, and this is reflected as a $\theta_\pi$ output of sub-harmonic generator 31 during time periods 8 through 11. The third bit to be entered, a $\theta_\pi$ input during time periods 12 through 15 is reflected as a $\theta_\pi$ output of sub-harmonic generator 31 during time periods 14 through 17. Referring now to the output of sub-harmonic generator 34, it can be seen that each of these bits of information has been shifted to sub-harmonic generator 34 so that output of sub-harmonic generator 34 during time periods 4 through 7 is $\theta_0$, the first bit; the output of sub-harmonic generator 34 during time periods 10 through 13 is $\theta_\pi$, the second bit; the output of sub-harmonic generator 34 during time periods 16 through 19 is $\theta_\pi$, the third bit to be entered into the register.

Similarly, the three bits of information are shifted to succeeding sub-harmonic generators of the register, the first bit of information, $\theta_0$, is transferred from sub-harmonic generator 11 to the output or to sub-harmonic generator 33, during time periods 18 through 21. Similarly, the second bit, $\theta_\pi$, is shifted out of sub-harmonic generator 11 during time periods 24 through 27 and the third bit, $\theta_\pi$, is shifted out of sub-harmonic generator 11 during time periods 30 through 33. Thus, information which has been read into the register serially is shifted out of the register serially after a time delay dependent upon the number of stages in the register.

Since, in the subject problem, these three bits of information are to be re-circulated in the register, the read-in control voltage is changed from the $\theta_\pi$ condition to the $\theta_0$ condition during time intervals 18 through 21 and subsequent time intervals as long as the information is to be re-circulated. Since, in the subject problem, the information is to be re-circulated twice, the read-in control voltage is maintained in the $\theta_0$ condition through time period 51. Because the read-in control voltage is in the $\theta_0$ condition during time intervals 18 through 21, the output of sub-harmonic generator 1 will be $\theta_0$ regardless of the condition of the input. That is, input information is not being loaded into the register. On the other hand, with the read-in control voltage in the $\theta_0$ condition, the output of inverter 32 is $\theta_\pi$ and the output of sub-harmonic generator 33 will be dependent upon the output of sub-harmonic generator 11. Therefore, during time intervals 20 through 23 the output of sub-harmonic generator 33 is $\theta_0$. This is the first bit of information inserted into the storage register and was shifted from sub-harmonic generator 11 to sub-harmonic generator 33 to be re-circulated in the register. Similarly, during time periods 26 through 29 the second bit of information, $\theta_\pi$, appears as an output of sub-harmonic generator 33 and during time periods 32 through 35 the third bit of information appears as an output of sub-harmonic generator 33. These three bits of information are re-circulated in the register so that they are again shifted out of sub-harmonic generator 11 during time periods 36 through 39, 42 through 45, and 48 through 51. In accordance with the subject problem these three bits of information are re-circulated in the register once more so that they appear as outputs of sub-harmonic generator 11 during time periods 54 through 57, 60 through 63, and 66 through 69.

In accordance with the subject problem, the read-in control voltage is switched from $\theta_0$ to the $\theta_\pi$ condition during time intervals 54 through 57 and thereafter to permit new information to again be inserted into the register. Therefore, the input during time periods 55 through 58, $\theta_\pi$; the input during time periods 61 through 64, $\theta_0$; and the input during time periods 67 through 70, $\theta_\pi$, will all be entered into the register and shifted through the stages of the register in the manner described above.

It should be noted that because of the manner in which information is shifted in the register, one stage of the register may be considered to be three consecutive sub-harmonic generators. Thus, the nine series connected sub-harmonic generators of the circuit of FIGURE 3 comprise three stages of a shift register. These three stages are capable of storing and re-circulating three bits of information.

Referring now to FIGURE 5, there is shown a shift register which will shift information from stage-to-stage or store information in each stage as desired. Whether the shift register shifts information or stores information is controlled by a right shift control voltage which is applied directly to each stage and applied through an inverter 40 to each stage.

Input information which is to be loaded into the shift register is applied to an input sub-harmonic generator 41 which is biased to the $\theta_0$ condition. The right shift control voltage is also aplied as an input to sub-harmonic generator 41. Each stage of the shift register further comprises sub-harmonic generators 42, 43, and 44 connected in a ring to form a latch. The output of inverter 40 is applied to the input of the re-circulation sub-harmonic generator 43 which is biased to the $\theta_0$ condition. Because of the biasing of the input sub-harmonic generator 41 and the re-circulation sub-harmonic generator 43, when the right shift control is in the $\theta_\pi$ phase condition input information will be inserted into the stage. However, when the right shift control is in the $\theta_0$ condition the re-circulation sub-harmonic generator 43 will be activated and information previously inserted in the stage will be re-circulated.

The remaining stages of the shift register are similar. That is, the second stage comprises the input sub-harmonic generator 45 and the sub-harmonic generator 46, a re-circulation sub-harmonic generator 47 and a sub-harmonic generator 48 connected in a ring. Similarly each of the stages of the shift register comprise an input sub-harmonic generator and three additional sub-harmonic generators connected in a ring.

The operation of the shift register of FIGURE 5 can best be described with reference to the timing diagram of FIGURE 6. Referring to FIGURE 6, and the legend therefor in FIGURE 6*a*, $P_1$, $P_2$, and $P_3$ show the timing of the power supplies which are applied to the sub-harmonic generators in each stage. The timing of the power supplies is the same as the timing for the power supplies in the shift register of FIGURE 3. The right shift control voltage is of a periodic nature and is in the $\theta_\pi$ phase condition when information is to be loaded into the register and shifted to succeeding stages. The right shift control voltage is switched to the $\theta_0$ condition when information is to be stored in each of the stages.

The operation of the shift register can best be described with reference to a problem in operation of the register. In this problem, three bits of information, $\theta_\pi$, $\theta_0$, and $\theta_\pi$ are to be inserted into the register. After this information is loaded into the register it is to be stored for three periods and then three new bits of information, $\theta_0$, $\theta_\pi$, and $\theta_0$ are to be loaded into the register. The information previously stored in the register is shifted further to the right during this time interval. In order to load new information into the register and shift it to succeeding stages the right shift control voltage is in the $\theta_\pi$ conditions during time periods 0 through 3, 6 through 9, and 12 through 15. During these time periods the output of sub-harmonic generator 41 is dependent upon the input information. Thus, the output of sub-harmonic generator 41 is $\theta_\pi$, the first bit, during time periods 2 through 5; the output is $\theta_0$, the second bit, during time periods 8 through 11; and the output of sub-harmonic generator 41 is $\theta_\pi$, the third bit, during time periods 14 through 17.

Because the right shift control voltage is in the $\theta_\pi$ condition when these three bits are being entered, the output of inverter 40 will be $\theta_0$ and because of the bias to the $\theta_0$ condition of sub-harmonic generator 43 the output of this sub-harmonic generator 43 will be $\theta_0$ during these time periods. Therefore, the output of sub-harmonic generator 44 will be dependent upon the output of sub-harmonic generator 41. Thus, the first three bits of information are inserted into sub-harmonic generator 44 and in turn are inserted into sub-harmonic generator 42.

The output of sub-harmonic generator 42 is connected to the input sub-harmonic generator 45 in the next succeeding stage. Because of this connection the first bit of information, $\theta_\pi$, appears as an output of subharmonic generator 45 during time periods 8 through 11. This first bit of information passes through sub-harmonic generator 48 and sub-harmonic generator 46 and, under control of the right shift control voltage of $\theta_\pi$. The first bit is then transferred to the input sub-harmonic generator 49 of the third stage of the shift register.

During time intervals 14 through 17 the first bit of information, $\theta_\pi$, is stored in the third stage of the register and appears as a $\theta_\pi$ output of sub-harmonic generator 49. Similarly, the second bit of information, $\theta_0$, is stored in the second stage of the shift register and appears as the $\theta_0$ output of sub-harmonic generator 45. The third bit of information is stored in the first stage of the shift register during these time periods and appears as a $\theta_\pi$ output of sub-harmonic generator 41. Since all three bits of information have been loaded into the register and shifted to succeeding stages, in accordance with the problem, the right shift control voltage is changed from the $\theta_\pi$ to the $\theta_0$ condition so that these three bits of information are stored in each of the stages of the shift register. The right shift control voltage is maintained in the $\theta_0$ condition during time intervals 18 through 21, 24 through 27, and 30 through 33. During these time intervals the third bit of information, $\theta_\pi$, is recirculated in the first stage, the second bit of information, $\theta_0$, is recirculated in the second stage and the first bit of information, $\theta_\pi$, is recirculated in the third stage.

During the time periods that the shift register is in the store condition, the outputs of the input sub-harmonic generators 41, 45, and 49 are always $\theta_0$ because these sub-harmonic generators are biased toward the $\theta_0$ condition and the application of a $\theta_0$ right shift control voltage causes the output to be $\theta_0$ regardless of the information which appears on the input line. Thus, new information cannot be shifted into any of the stages. On the other hand, the output of inverter 40 is $\theta_\pi$ during these time periods. Because of this the output of sub-harmonic generators 43, 47 and 51 will be dependent upon the information previously stored in each of the stages. The information stored in each of the stages will be caused to recirculate in the stages when the shift register is in the store condition.

At the end of time period 33 the right shift control voltage is switched back to the $\theta_\pi$ condition so that the shift register can again accept new information and shift it to succeeding stages. Under these conditions, three new bits of information, $\theta_0$, $\theta_\pi$, and $\theta_0$, are inserted into the shift register and shifted to succeeding stages.

The circuit of FIGURE 7 is quite similar to the circuit of FIGURE 5 except that provision is made for shifting information both toward the right as in the circuit of FIGURE 5 and to the left. As in FIGURE 5, the right shift control voltage is applied to each stage and to an inverter 70. The output of this inverter 70 is also applied to each stage. A left shift control voltage is also provided in the circuit of FIGURE 7. The left shift control voltage is applied to each stage and to an inverter 71. The output of the inverter 71 is also applied to each stage.

Each stage of the shift register of FIGURE 7 includes a right shift input sub-harmonic generator designated 72 in the first stage and three sub-harmonic generators 73, 74 and 75 connected in a ring to form a latch just as in the shift register shown in FIGURE 5. The stages of the subject shift register additionally include a left shift input sub-harmonic generator designated 76 in the first stage.

The timing of the power waves $P_1$, $P_2$, and $P_3$ are as shown in FIGURE 6. Additionally, the timing of the right shift control voltage is as shown in FIGURE 6. The timing of the left shift control voltage is shown at the bottom of FIGURE 6.

The operation of the register when it is desired to shift information to the right is the same as the operation of the shift register of FIGURE 5. That is, when the right shift control voltage is in the $\theta_\pi$ condition new input information will be accepted by the input sub-harmonic generator 72 and the information will be shifted to succeeding stages to the right of the first stage. When it is desired to shift information in the register to the left, the left shift control voltage is switched from the $\theta_0$ to the $\theta_\pi$ state. Conversely, the right shift control is switched from the $\theta_\pi$ to the $\theta_0$ state. Under these conditions, a bit of information stored in, for example, the second stage will be shifted to the first stage. The information in the second stage is entered through the left shift input sub-harmonic generator 76 and thence into the sub-harmonic generators of the first stage.

The store condition of the shift register of FIGURE 7 is achieved by switching both the right shift control voltage and the left shift control voltage to the $\theta_0$ condition. Under these circumstances, information previously entered into each of the stages will be recirculated in each stage.

A summary of the operating conditions of the shift register of FIGURE 7 follows:

When the right shift control voltage is in the $\theta_\pi$ condition and the left shift control voltage is in the $\theta_0$ condition, the register will shift information toward the right; when the right shift control voltage is in the $\theta_0$ condition and the left shift control voltage is in the $\theta_\pi$ condition, the register will shift information toward the left; when both the right shift control voltage and the left shift control voltage are in the $\theta_0$ condition, the register is in the store condition and information is recirculated in each of the stages.

The shift register of FIGURE 7 can be further modified to make provision for the parallel entry of input information. Such a modification is shown in FIGURE 8. This shift register is the same as the shift register of FIGURE 7 except that there is no connection between the second stage and sub-harmonic generator 86 of the first stage. Instead, the input to sub-harmonic generator 86 is a parallel input. A similar modification is made in the succeeding stages.

Further, a parallel input control voltage is applied to inverter 81 instead of the left shift control voltage of the modification of FIGURE 7. The parallel input control voltage has the same timing as the left shift control voltage.

The operation of the shift register of FIGURE 7 is as follows:

When the right shift control voltage is in the $\theta_\pi$ state and the parallel input control voltage is in the $\theta_0$ state, information is entered serially to the first stage of the shift register and shifted to the right as in previous modifications. However, when the right shift control voltage is in the $\theta_0$ condition and the parallel input control voltage is in the $\theta_\pi$ condition, parallel information is entered into each stage of the shift register. When the right shift control voltage is in the $\theta_0$ state and the parallel input control voltage is in the $\theta_0$ state information previously entered into each stage will recirculate in these stages; that is, the shift register is in the store condition.

While certain specific embodiments of my invention have been shown and described, it will, of course, be understood that various other modifications may be made without departing from the principles of the invention. The appended claim is therefore intended to cover any such modifications within the true spirit and scope of the invention.

What I claim as new and desire to secure by Letters Patent in the United States is:

A shift register utilizing sub-harmonic generators of the type which produce bistable outputs indicative of the phase of the inputs comprising a plurality of cascaded stages, each of said stages comprising three sub-harmonic generators of the type having a power wave and an input having one of two phase relationships with respect to said power wave impressed thereon, the first stage of said shift register further including an input sub-harmonic generator of the type having a power wave and three inputs impressed thereon, the first of said inputs biasing said input sub-harmonic generator to a first phase condition, the information to be loaded into said register being applied to the second input to said input sub-harmonic generator, a source of periodic read-in control voltage, said read-in control voltage having a bistable phase condition, said read-in control voltage being applied to the third input to said input sub-harmonic generator, a phase inverter, said read-in control voltage being connected to said phase inverter, a re-circulation sub-harmonic generator of the type having a power wave and three inputs impressed thereon, the first of said inputs biasing said input sub-harbonic generator to the first phase condition, the output of said phase inverter being applied to a second input of said re-circulation sub-harmonic generator, the output of the last sub-harmonic generator in the last stage of said shift register being applied to the third input of said re-circulation sub-harmonic generator, a third sub-harmonic generator of the type having a power wave and three inputs impressed thereon, the first of said inputs biasing said third sub-harmonic generator to a second phase condition, the output of said input sub-harmonic generator being applied to the second input of said third sub-harmonic generator, the output of said re-circulation sub-harmonic generator being applied to the third input of said third sub-harmonic generator, the output of said third sub-harmonic generator of the type having a power wave and three inputs impressed thereon being connected to the input of the first of said series connected sub-harmonic generators of the type having a power wave and a single input impressed thereon, and means for switching said read-in control voltage between the first phase condition and the second phase condition whereby when said read-in control voltage is in the first phase condition information previously loaded into said shift register will re-circulate in said shift register and when said read-in control voltage is in the second phase condition input information will be loaded into said shift register and shifted to succeeding stages.

References Cited in the file of this patent

UNITED STATES PATENTS

| | | |
|---|---|---|
| 2,928,008 | Takahasi et al. | Mar. 8, 1960 |
| 2,932,012 | Jorgensen | Apr. 5, 1960 |
| 2,948,818 | Goto | Aug. 9, 1960 |
| 3,011,706 | Goto | Dec. 5, 1961 |